(12) United States Patent
Gattu et al.

(10) Patent No.: US 9,695,956 B2
(45) Date of Patent: Jul. 4, 2017

(54) SPECTRAL ANALYSIS BASED DETECTOR FOR A CONTROL VALVE

(71) Applicant: Dresser, Inc., Austin, TX (US)

(72) Inventors: Jagadish Gattu, Randolph, MA (US); Justin Shriver, Randolph, MA (US)

(73) Assignee: Dresser, Inc., Houston, TX (US)

( * ) Notice: Subject to any disclaimer, the term of this patent is extended or adjusted under 35 U.S.C. 154(b) by 896 days.

(21) Appl. No.: 13/952,748

(22) Filed: Jul. 29, 2013

(65) Prior Publication Data

US 2015/0032270 A1 Jan. 29, 2015

(51) Int. Cl.
G06F 19/00 (2011.01)
F16K 37/00 (2006.01)
F15B 19/00 (2006.01)

(52) U.S. Cl.
CPC ........ F16K 37/0083 (2013.01); F15B 19/005 (2013.01); F15B 2211/6303 (2013.01); F15B 2211/6313 (2013.01); F15B 2211/6336 (2013.01)

(58) Field of Classification Search
USPC ........................................................ 700/282
See application file for complete search history.

(56) References Cited

U.S. PATENT DOCUMENTS

| 4,274,438 A | 6/1981 | La Coste |
| 4,965,513 A | 10/1990 | Haynes et al. |
| 5,750,879 A | 5/1998 | Ohtsuka et al. |
| 6,272,401 B1 * | 8/2001 | Boger ................. F15B 5/006 700/282 |
| 6,530,277 B2 * | 3/2003 | Kumpfmueller ... F16K 37/0083 73/168 |
| 6,637,267 B2 * | 10/2003 | Fiebelkorn .......... F16K 37/0083 73/587 |
| 7,089,086 B2 | 8/2006 | Schoonover |
| 7,124,057 B2 | 10/2006 | Forster et al. |
| 7,890,216 B2 | 2/2011 | Boger et al. |
| 8,036,837 B2 | 10/2011 | Wilke |
| 8,277,571 B2 * | 10/2012 | Didat ................. A47L 15/0023 134/18 |
| 2001/0037670 A1 * | 11/2001 | Boger ................. F15B 5/006 73/1.72 |
| 2002/0040284 A1 * | 4/2002 | Junk ....................... G05B 5/01 702/189 |

(Continued)

FOREIGN PATENT DOCUMENTS

| EP | 1441266 A2 | 7/2004 |
| WO | 9506276 A1 | 3/1995 |

OTHER PUBLICATIONS

Maruta—Modeling and Detection of Stiction in Pneumatic Control Valves, Trans. of the Society of Instrument and Control Engineers, vol.E-4, No. 1, 18/26 (2005) (9 pages).

(Continued)

*Primary Examiner* — Kidest Bahta
(74) *Attorney, Agent, or Firm* — Mintz Levin Cohn Ferris Glovsky and Popeo, P.C.

(57) ABSTRACT

Systems and methods for diagnosing components of a control system are disclosed herein. In some embodiments, the spectral content of various signals originating from a control valve is used to detect periodic patterns that can correspond to valve problems.

20 Claims, 8 Drawing Sheets

(56) References Cited

U.S. PATENT DOCUMENTS

| | | | |
|---|---|---|---|
| 2003/0019297 A1* | 1/2003 | Fiebelkorn | F16K 37/0083 73/587 |
| 2004/0187566 A1* | 9/2004 | Nisimura | F02D 41/221 73/114.65 |
| 2005/0029476 A1* | 2/2005 | Biester | E21B 33/0355 251/58 |
| 2005/0126639 A1* | 6/2005 | Ens | F16K 37/0083 137/554 |
| 2005/0194554 A1* | 9/2005 | Seberger | G05B 19/058 251/129.04 |
| 2006/0195265 A1 | 8/2006 | Schen et al. | |
| 2006/0260702 A1* | 11/2006 | Levesque | F16K 37/0091 137/803 |
| 2007/0148007 A1 | 6/2007 | Garlow | |
| 2009/0222220 A1* | 9/2009 | Wilke | F16K 37/0091 702/34 |
| 2010/0089473 A1* | 4/2010 | Grein | F16K 37/0083 137/553 |
| 2010/0152907 A1 | 6/2010 | Meier et al. | |
| 2011/0082665 A1 | 4/2011 | Tabaru et al. | |
| 2011/0178750 A1* | 7/2011 | Kitamura | G01L 23/225 702/76 |
| 2011/0232966 A1 | 9/2011 | Kyllingstad | |
| 2012/0011180 A1* | 1/2012 | Kavaklioglu | C10G 11/187 708/202 |

OTHER PUBLICATIONS

Scali—Experimental Characterization and Diagnosis of Different Problems in Control Valves, ENEL, Ingegneria e Innovazione, Area Tecnica Ricerca; Via A. Pisano, n. 120, 56122, Pisa (Italy) (2011) (6 pages).

Farenzena—Valve backlash and stiction detection in integrating processes, 8th IFAC Symposium on Advanced Control of Chemical Processes, Furama Riverfront, Singapore, Jul. 10-13, 2012 (5 pages).

Choudhury—Detection and Quantification of Control Valve Stiction, American Control Conference, 2006, Jun. 14-16, 2006 (6 pages).

International Search Report and Written Opinion issued in connection with corresponding PCT Application No. PCT/US2014/048399 on Nov. 24, 2014.

* cited by examiner

SPECTRAL ANALYSIS BASED DETECTOR FOR A CONTROL VALVE

FIELD

The subject matter disclosed herein generally relates to systems and methods for diagnosing components of a control system. For example, systems and methods for detecting stick-slip, shut-off cycling, and aggressive tuning in a control valve are disclosed herein.

BACKGROUND

In the process industry, valves typically operate on a continuous basis. The life time of the valve can depend on how well the valve reaches a position specified by the control system. However, there can be several reasons why a valve might run into a cycling state as it tries to reach its destination.

Some of these cycling behaviors may damp themselves, eventually letting the valve settle to a steady state. But, regardless of whether the valve becomes stable, the cycling behavior is detrimental to both the valve and the control. Cycling causes the valve to wear out quickly, and causes the valve to take longer to meet the control system requirements resulting in a sub-optimal process. Detecting the cycling behavior and correcting it can significantly improve the valve life and the process efficiency.

Cycling behaviors can be classified into categories, which can include stick-slip cycling (also known as "stiction"), shut-off cycling, and flow loop aggressive tuning.

Stick-slip or stiction is a phenomenon in which the valve sticks due to friction from tight packaging, debris, etc. and fails to respond even as force is exerted on the valve stem. Eventually, as the force is increased to break the friction, the valve slips and has a jerky motion. This can make the process inefficient as the valve becomes less responsive. Furthermore, depending on the cause of this behavior, it can also lead to increased wear on the valve.

Shut-off cycling is a phenomenon in which the valve frequently shuts off and opens in a cyclic manner. Valves generally have a shut-off limit. When the valve reaches that position it needs to shut off completely, cutting off any flow through the valve. Over time, however, the valve can develop a loose linkage, sensor drift, or an incorrectly-set shut-off limit. These issues can cause the valve to operate close to the shut-off limit, causing the valve to shut off and open frequently. Since shut-off is hard on the plug, frequent shut-off can damage the valve.

Flow loop aggressive tuning is a phenomenon in which the control system does not wait long enough for the valve to catch up, causing the valve to cycle. In other words, the valve continuously tries to catch up with the set-point, which is changed aggressively by the control system to compensate for the error. This again can wear out the valve due to unneeded and often continuous movement of the valve.

In the past, methods to detect slick-slip have depended on either the velocity of the valve plug or the shape of a graph of valve position versus set-point. The velocity-based approach is not very efficient when there is lack of motion due to the valve sticking or due to the valve being held at a steady state. It is thus important to look at the set-point to understand whether the valve is expected to move. The other approach, which compares the set-point and the valve position, attempts to do this. Detection based on the shape of this plot, however, can be especially inaccurate in the presence of noise, which can deform the shape of the graph. Existing systems do not have provisions for detecting other cycling behaviors, such as shut-off cycling and flow loop aggressive tuning.

Accordingly, a need exists for systems and methods for diagnosing components of a control system.

BRIEF DESCRIPTION

Systems and methods for diagnosing components of a control system are disclosed herein. In some embodiments, the spectral content of various signals originating from a control valve is used to detect periodic patterns that can correspond to valve problems. In particular, sensors on the control valve can be configured to gather valve position and actuator pressure data, which in turn can be analyzed along with set point data to detect the frequency spectrum. A dominant frequency in the spectrum coupled with the characteristics of the valve position, and its root mean squared difference with the set-point, can be used to detect the nature of the cycling in the control valve. Independent spectral analysis on the data for each sensor can allow the detection of cycling to be validated. This cross-verification can increase the diagnostic accuracy of the system.

BRIEF DESCRIPTION OF THE DRAWINGS

These and other features will be more readily understood from the following detailed description taken in conjunction with the accompanying drawings, in which.

Figure 1:
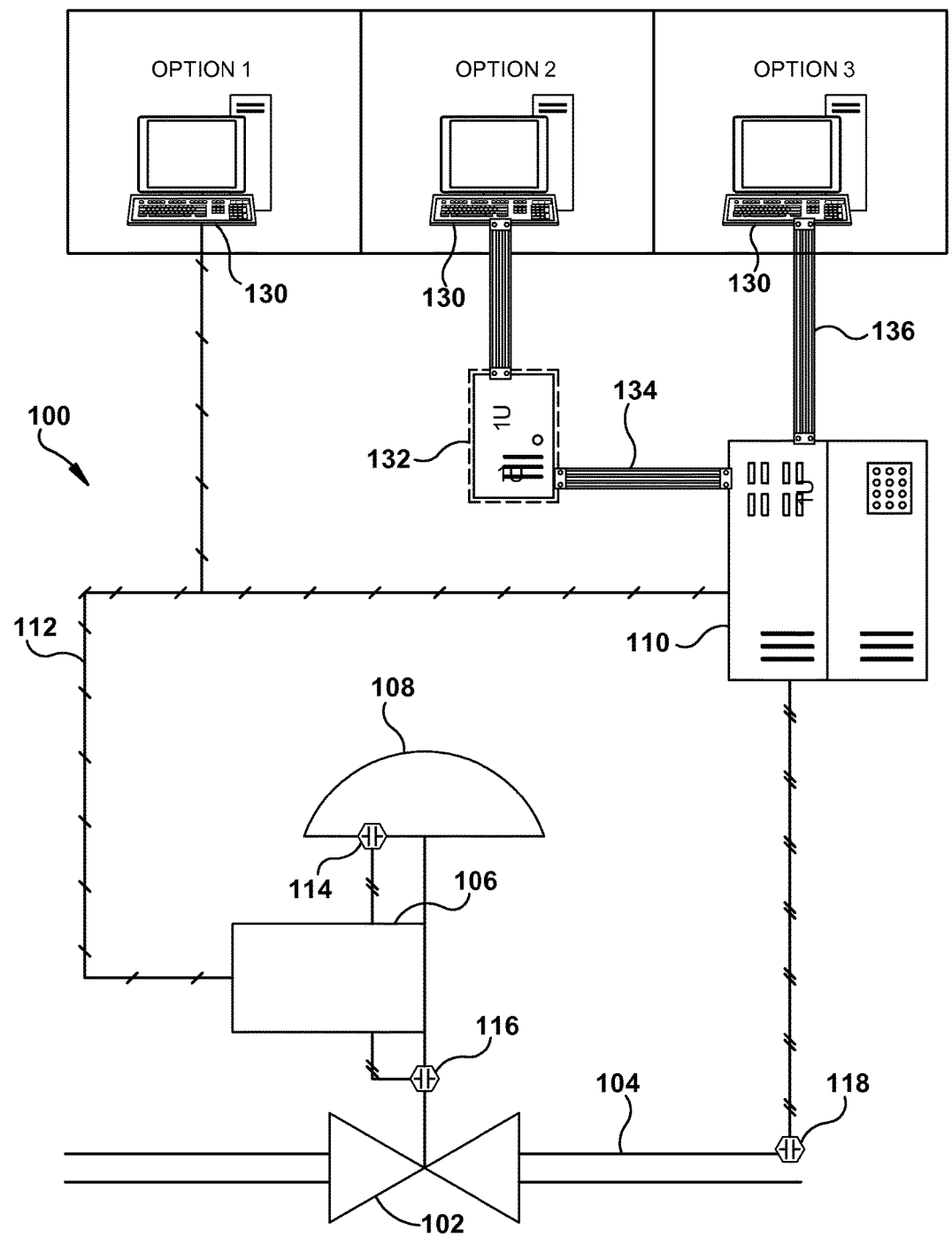
FIG. 1 is a schematic diagram of an exemplary system in which valve cycling can be diagnosed.

It is noted that the drawings are not necessarily to scale. The drawings are intended to depict only typical aspects of the subject matter disclosed herein, and therefore should not be considered as limiting the scope of the disclosure. In the drawings, like numbering represents like elements between the drawings.

DETAILED DESCRIPTION

Certain exemplary embodiments will now be described to provide an overall understanding of the principles of the structure, function, manufacture, and use of the devices, systems, and methods disclosed herein.

Systems and methods for diagnosing components of a control system are disclosed herein. In some embodiments, the spectral content of various signals originating from a control valve is used to detect periodic patterns that can correspond to valve problems. In particular, sensors on the control valve can be configured to gather valve position and actuator pressure data, which in turn can be analyzed along with set point data to detect the frequency spectrum. A dominant frequency in the spectrum coupled with the characteristics of the valve position, and its root mean squared difference with the set-point, can be used to detect the nature of the cycling in the control valve. Independent spectral analysis on the data for each sensor can allow the detection of cycling to be validated. This cross-verification can increase the diagnostic accuracy of the system.

FIG. 1 illustrates one exemplary embodiment of system 100 in which valve cycling can be diagnosed. As shown, the system can include a control valve 102, e.g., for controlling the flow through a pipe 104. The system 100 can also include a positioner 106, an actuator 108, and a distributed control system ("DCS") 110. The positioner 106 receives set-point information for the valve 102 from the DCS 110 over a network 112. Exemplary networks include HART or Foundation Fieldbus systems. The control valve 102 can include an actuator pressure sensor 114 and a position sensor 116 to measure the actuator pressure and the valve position, respectively. While sensing actuation pressure is generally described herein, it will be appreciated that other actuation parameters can be sensed instead or in addition. For example, in the case of valves which are not pneumatically-actuated, actuation force can be sensed instead of actuation pressure. The system 100 can include a flow sensor 118 on the flow piping 104 to provide an individual control loop for the valve 102 to the DCS 110.

Figure 2:
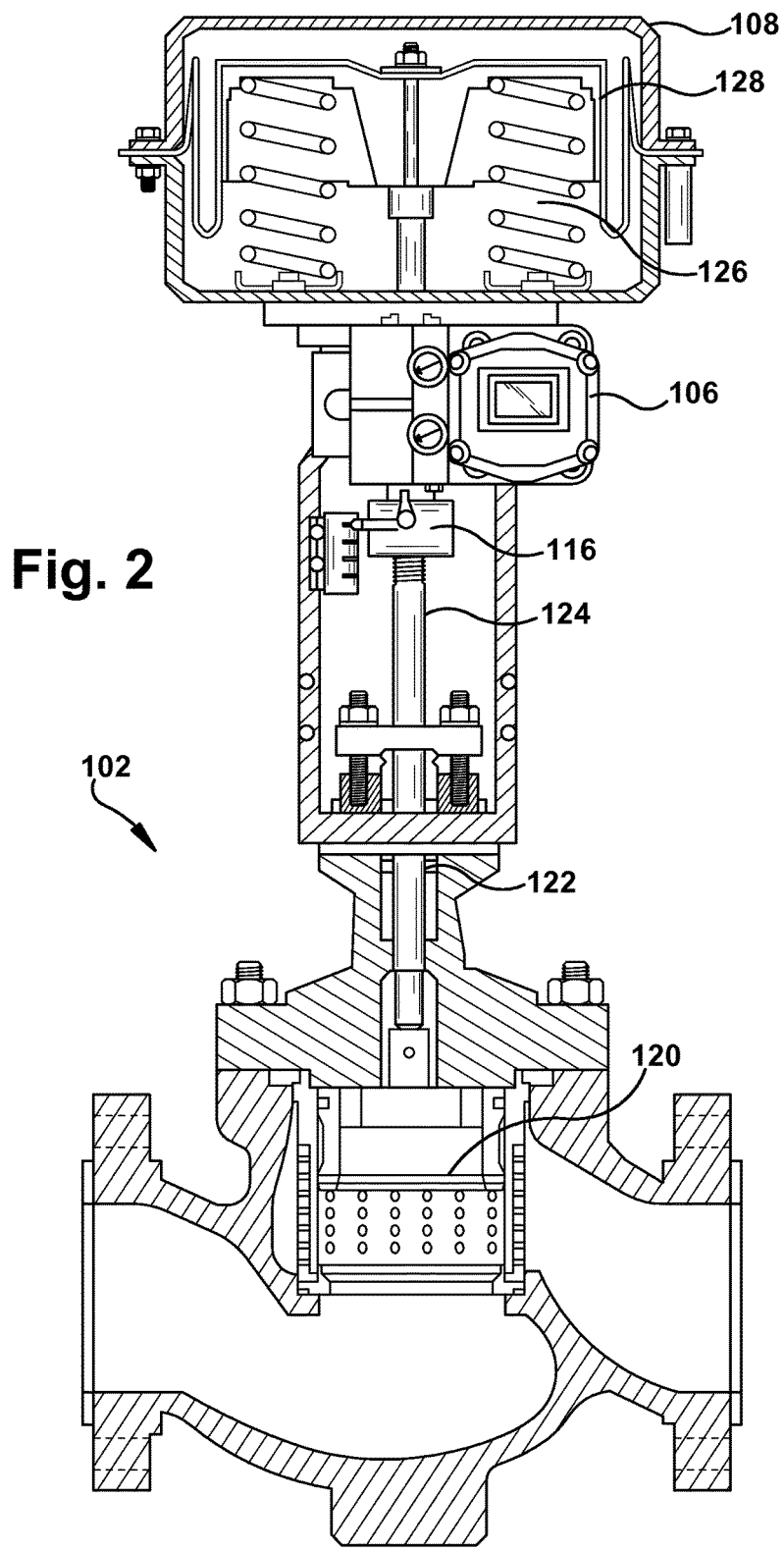
FIG. 2 is a sectional side view of an exemplary control valve.

FIG. 2 is a sectional side view of the control valve 102, the positioner 106, and the actuator 108. In the illustrated embodiment, the valve 102 includes a valve plug 120, packaging 122, and a valve stem 124. The position sensor 116 can be coupled to the valve stem 124, e.g., via a mechanical linkage, to detect the position of the valve stem. The actuator 108 can include a spring 126 and a diaphragm 128. When pressurized air is applied to the diaphragm 128, the assembly rotates to advance or retract the valve stem 124 and thereby adjust the position of the valve plug 120. While a pneumatic actuator is shown, it will be appreciated that the actuator can also be hydraulic, electric, etc.

Referring again to FIG. 1, set point information and data from the sensors 114, 116 can be processed and analyzed by a computer system 130. The computer system 130 can be coupled to components of the system 100 in any of a variety of ways. For example, the computer system 130 can be directly connected to the network 112 with access to the control valve 102 and/or the DCS 110 (e.g., "Option 1" as shown in FIG. 1). Alternatively, or in addition, the computer system 130 can be coupled to an asset management system 132, which in turn can be coupled to the DCS 110 via a network 134 (e.g., "Option 2" as shown in FIG. 1). As yet another example, the computer system 130 can be coupled directly to the DCS 110 via a network 136 (e.g., "Option 3" as shown in FIG. 1). The computer system 130 can thus be in communications coupling with one or more components of the system 100 (e.g., via a hardwired or wireless connection). It will also be appreciated that the DCS 110 can be or can include the computer system, that the positioner 106 can be or can include the computer system, and that the computer system can be an embedded or integral component of any of the devices in the system 100. Exemplary computer systems include workstation computers, server computers, laptop computers, tablet computers, mobile devices, embedded controllers, ASICs, FPGAs, and the like. An exemplary computer system architecture is described below with respect to FIG. 8.

While a single valve 102 is shown in FIG. 1, it will be appreciated that that system 100 can be coupled to a plurality of valves and can be used to diagnose a plurality of valves.

When a valve is experiencing cycling problems, its position data demonstrates the repetitive motion. In addition, since the position is influenced by the actuator pressure, periodicity can be observed in the actuator pressure as well. The set point data, on the other hand, may or may not show these characteristics, depending on the issue driving the cycling. Detecting the periodicity in the position and/or actuator pressure data can enable the diagnosis of issues such as stick-slip, shut-off cycling, and aggressive tuning.

In some embodiments, the computer system uses a Fourier transform to convert position and pressure data from a mathematical function of time $f(t)$ into a function of frequency $f'(w)$. This new function, also known as the frequency spectrum, can provide insight into the major frequencies in the data. Any periodic behavior with a frequency $f1$ will have high amplitude in the new function $f'$. By detecting peaks in the new frequency spectrum, significant frequencies in the sensor data can be identified. The following equations demonstrate how this can be done.

Let $X_i$ represent the position data, and $P_i$ the pressure data, where i is the sample number. Assume that $T_i$ is the time at which the samples are collected, and N is the total number of samples. Before the frequency spectrum is computed for the data, the computer system can adjust the data to ensure uniform sampling. Let $\hat{T}_i$ represent the new time series which has uniform sample time of $F_s=(\hat{T}_{i+1}-\hat{T}_i)$, while $\hat{X}_i$ and $\hat{P}_i$ represent the corresponding position and pressure data corresponding to the new time series.

$$\hat{T}_i = T_1 + (i-1) * \frac{T_N - T_1}{N} \text{ for } i = 1, 2, \ldots N$$

$$\hat{X} = \text{interpolate}(X, T, \hat{T})$$

$$\hat{P} = \text{interpolate}(P, T, \hat{T})$$

The interpolation technique used above for the position and pressure data can be linear, or of higher order.

Fourier transforms of $\hat{X}$ and $\hat{P}$ will provide the frequency spectrum of this position and pressure data. The frequency spectrum can be represented as X'(w) and P'(w).

$$X'(w_j) = \Sigma_{n=-\infty}^{N=\infty} X[n] e^{-iw_j n}$$

$$P'(w_j) = \Sigma_{n=-\infty}^{N=\infty} P[n] e^{-iw_j n}$$

Where $w_j$ represents the discrete frequencies, such that $$w_{j+1} - w_j = \frac{1}{F_s * N},$$

and j=1, 2, . . . $F_s/2$.

The computer system can then detect peaks in the frequency spectrum. The existence of such peaks indicates the presence of a major frequency, thereby enabling the detection of periodicity in the signal. This in turn implies that the valve is under cyclic motion. The computer system can use any of a variety of techniques to find the peaks, such as outlier techniques or simpler peak detection methods based on the mean. In the following example, peak detection is performed using the Grubb's outlier detection method, represented by the following equations:

$$G_j = \frac{|X'_j - \tilde{X}|}{s}$$

where $\tilde{X}$ is the mean, s is the standard deviation, and j indicates the frequency steps.

$$L = \frac{N-1}{\sqrt{N}} \sqrt{\frac{t^2_{\frac{\alpha}{2N}, N-2}}{(N - 2 + t^2_{\frac{\alpha}{2N}, N-2})}}$$

where $$t^2_{\frac{\alpha}{2N}, N-2}$$

is the upper value of the t-distribution with N−2 degrees of freedom, and α is the significance level.

If $G_j > L$, it indicates the presence of an outlier/peak in the frequency spectrum, which suggests that the valve is cycling. The j at which $G_j$ is highest corresponds to the dominant frequency $w_j$ present in the data. The computer system can apply this technique for both the pressure data and the position data to find the dominant frequencies. For a true cycling behavior, the dominant frequencies in both pressure and position data should be the same (or approximately the same). In some embodiments, the dominant frequencies can be considered to be approximately equal when they are within about 10%, about 5%, about 3%, and/or about 1% of one another. Thus, the cycling diagnostic can be validated by comparing the dominant frequency in the pressure data to the dominant frequency in the position data. In some embodiments, however, the computer system can make the diagnosis based on only one of the pressure data and the position data.

At this point, the computer system can determine whether the minimum of the position data falls in the shut-off region, which can be defined as ±δ such that δ is close to or approximately zero. In other words, the computer system can determine whether the data indicates that the valve is operating within its shut-off region (e.g., within about 10%, within about 5%, within about 3%, and/or within about 1% of the closed position). The computer system can also determine whether the first order differential of the position data corresponding at the minimum position is within ±β such that β is close to or approximately zero. In other words, the computer system can determine whether the data indicates that the valve is staying in approximately the same position. If these two conditions are satisfied, the computer system can classify the valve behavior as shut-off cycling. It will be appreciated that β can be selected based on a variety of factors, such as the sensitivity and accuracy of the position sensor and the amount of vibration or other noise-contributors present in the valve's environment. Exemplary values for β include 10, 5, 1, 0.1, and 0.01.

If the criteria for shut-off cycling are not met, the computer system can calculate the root mean squared error of the position and set-point. If this value is greater than a predetermined threshold γ, it indicates that the set-point and the position are not tracking each other well. This indicates the presence of stick-slip since the valve cannot track the set-point in a stick-slip scenario. If the root mean squared error is lower than the threshold, however, it indicates that the valve is able to follow the set-point with reasonable performance. This means that the valve is experiencing aggressive tuning, causing the valve position to cycle. It will be appreciated that γ can be selected based on a variety of factors, such as the sensitivity and accuracy of the position sensor and the amount of vibration or other noise-contributors present in the valve's environment. Exemplary values for γ include 20, 10, 5, and 1.

It will be appreciated that the maximum frequency that can be detected from the frequency analysis depends on the sampling time of the position and pressure data. Thus, in some embodiments, the sampling frequency and the length of samples are chosen to have the appropriate bandwidth for most of the valve cycling frequencies. In a case where the bandwidth is higher, the peak detection can be limited to the frequency range of interest. Further, the thresholds mentioned above, δ, β, γ can be chosen based on the typical operation of the plant. For example, δ can depend on the shut-off limit used for the valve. These limits can be either specified per individual valve or per the entire plant.

In some embodiments, the positioner can be configured to maintain a count of the tight shut-off cycles that have occurred, and the computer system can detect shut-off cycling by polling the positioner for this information and analyzing the count with respect to time to determine whether excessive shut-off is occurring. In some embodiments, the positioner can be configured to respond to an interrogation signal with an indication as to whether the valve is currently in tight shut-off. The computer system can thus detect shut-off cycling by periodically interrogating the positioner and determining how frequently tight shut-off is occurring.

The computer system can be configured to report its diagnosis in various ways. For example, the computer system can periodically display or send a message (e.g., to a system operator) indicating whether or not a cycling condition exists, or can issue an alert only when a problem is detected. The message can also indicate the type of cycling that is occurring. The computer system can also be configured to automatically attempt to remedy the issue, for example by instructing the system to adjust the valve control algorithm when aggressive tuning is detected or by instructing the system to adjust the tight shut-off threshold for the valve when shut-off cycling is detected.

Figure 3:
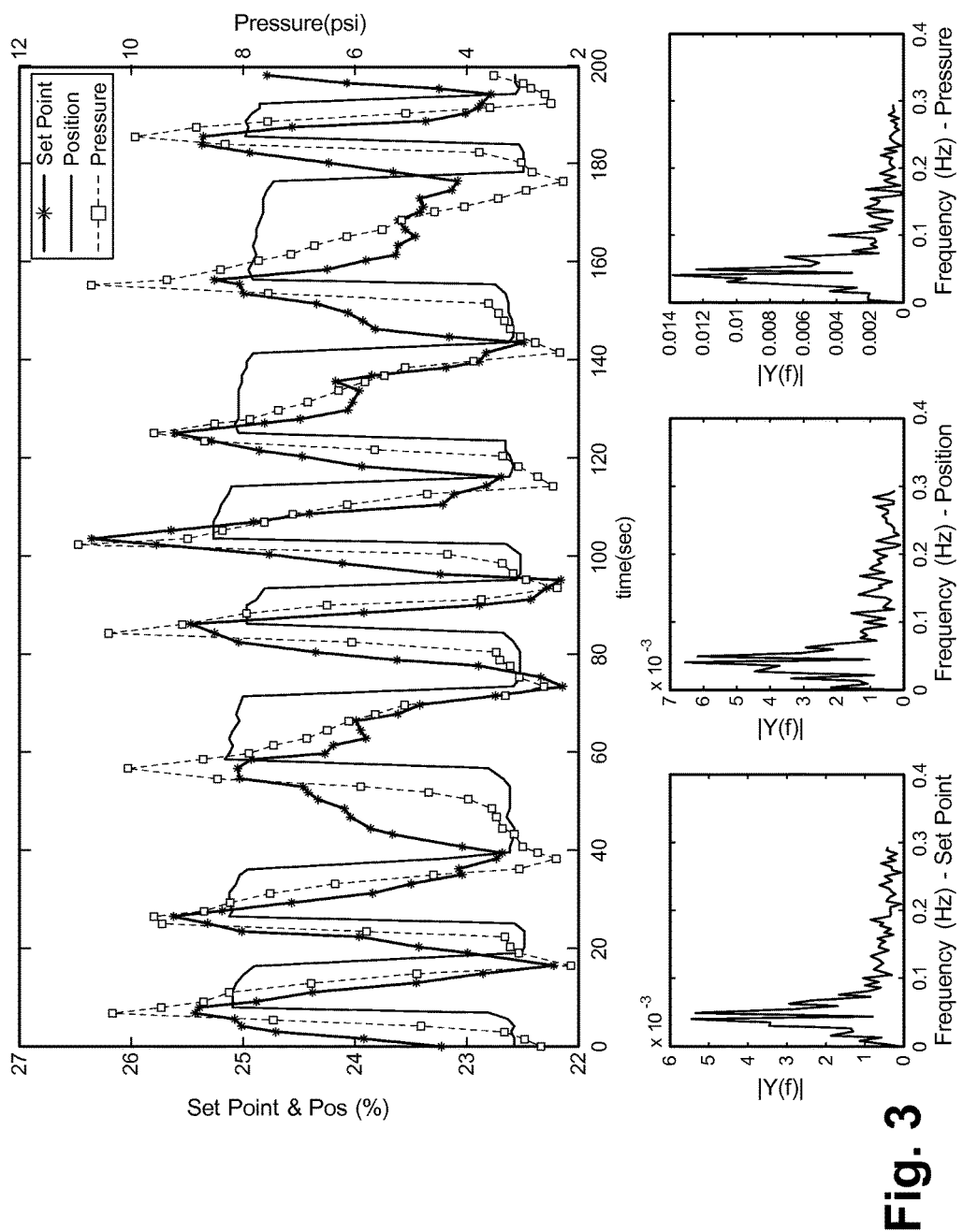
FIG. 3 is a plot of set-point, valve position, and actuator pressure for an exemplary control valve experiencing stick-slip, along with the frequency content of each signal.

FIG. 3 is a plot of set point, valve position, and actuator pressure data for an exemplary valve experiencing stick-slip behavior. The set point and valve position data is shown as percentage of valve opening as a function of time over a 200 second period. The actuator pressure data is shown as pressure in pounds per square inch over the same 200 second period. The inset portions of FIG. 3 illustrate the frequency spectrum of the set point data (left), the frequency spectrum of the position data (center), and the frequency spectrum of the pressure data (right).

As shown, a discernable dominant frequency exists in all three frequency spectra between about 0 Hz and about 0.1 Hz, indicating that cyclic behavior is present.

The minimum of the time-domain position data (about 22-23% open) is well above the closed position (about 0% open) and therefore shut-off cycling can be eliminated as a possible diagnosis. The position and set-point data, however, are not tracking each other well, as the set point data is well above or below the actual valve position in many instances. The root mean squared error of the position and set-point data would be above the predetermined threshold in this case, indicating that the cycling is due to stick-slip and not aggressive tuning.

Figure 4:
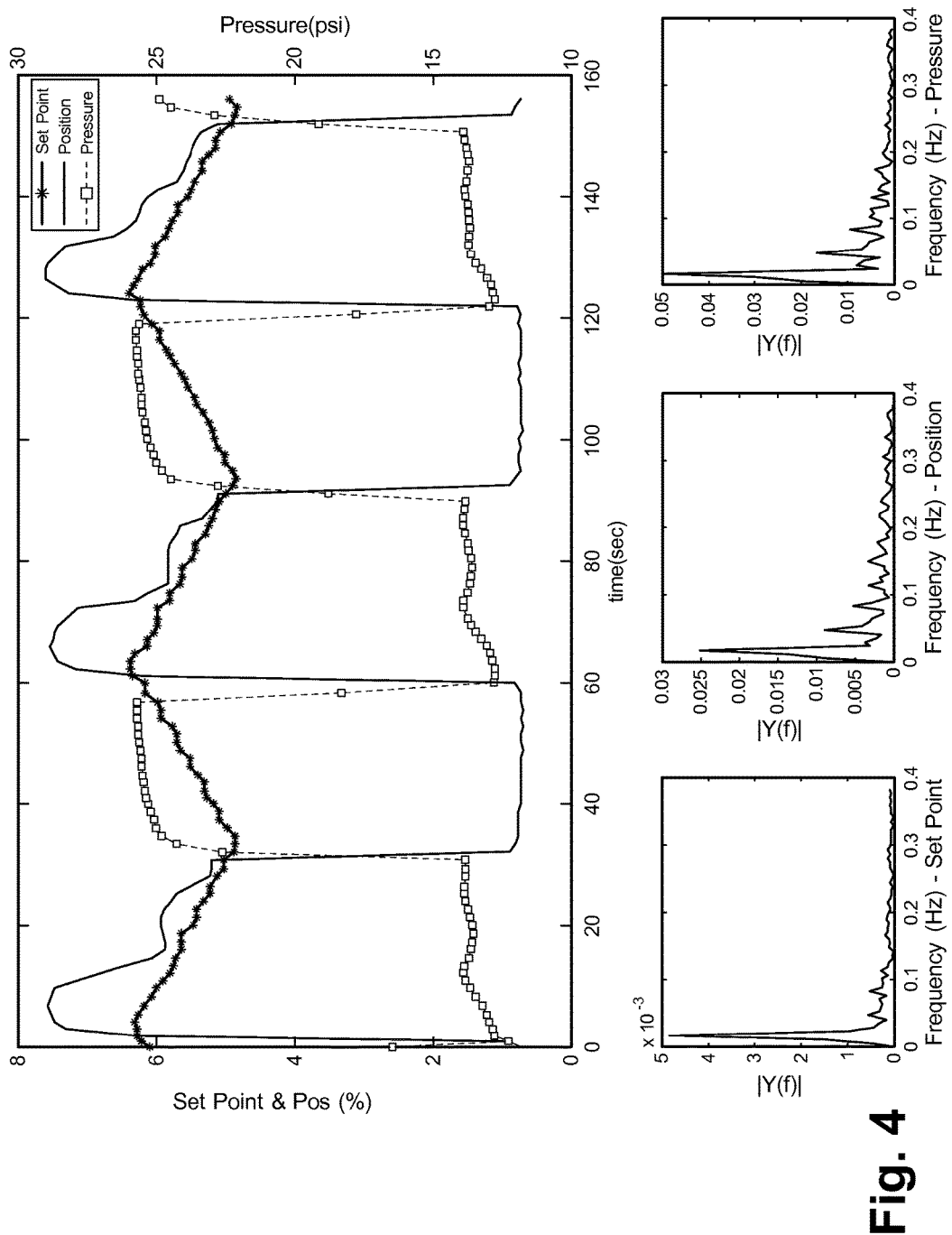
FIG. 4 is a plot of set-point, valve position, and actuator pressure for an exemplary control valve experiencing shut-off cycling, along with the frequency content of each signal.

FIG. 4 is a plot of set point, valve position, and actuator pressure data for an exemplary valve experiencing shut off cycling behavior. The set point and valve position data is shown as percentage of valve opening as a function of time over a 160 second period. The actuator pressure data is shown as pressure in pounds per square inch over the same 160 second period. The inset portions of FIG. 4 illustrate the frequency spectrum of the set point data (left), the frequency spectrum of the position data (center), and the frequency spectrum of the pressure data (right).

As shown, a discernable dominant frequency exists in all three frequency spectra between about 0 Hz and about 0.05 Hz, indicating that cyclic behavior is present.

The minimum of the time-domain position data (about 1% open) is very close to the closed position (about 0% open) and therefore shut-off cycling is a potential diagnosis. This diagnosis is confirmed by the fact that the time-domain position data is relatively flat in the vicinity of the minimum position (i.e., the first order differential of the position data at the minimum position is approximately zero).

Figure 5:
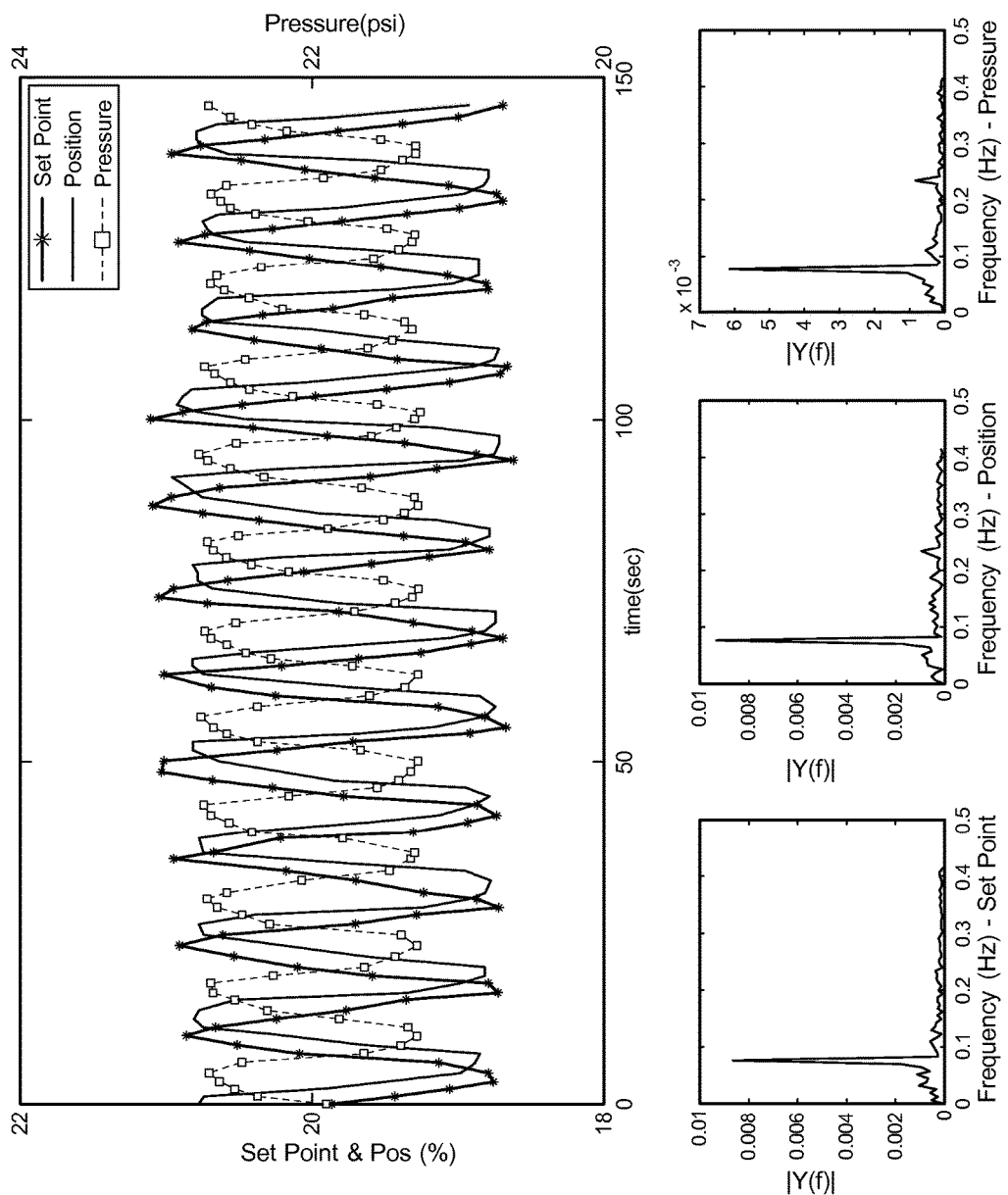
FIG. 5 is a plot of set-point, valve position, and actuator pressure for an exemplary control valve experiencing aggressive tuning, along with the frequency content of each signal.

FIG. 5 is a plot of set point, valve position, and actuator pressure data for an exemplary valve experiencing aggressive tuning behavior. The set point and valve position data is shown as percentage of valve opening as a function of time over a 150 second period. The actuator pressure data is shown as pressure in pounds per square inch over the same 150 second period. The inset portions of FIG. 5 illustrate the frequency spectrum of the set point data (left), the frequency spectrum of the position data (center), and the frequency spectrum of the pressure data (right).

As shown, a discernable dominant frequency exists in all three frequency spectra between about 0.05 Hz and about 0.1 Hz, indicating that cyclic behavior is present.

The minimum of the time-domain position data (about 19% open) is well above the closed position (about 0% open) and therefore shut-off cycling can be eliminated as a possible diagnosis. In addition, the position and set-point data are tracking each other well, as the set point data is relatively close to the actual valve position throughout the sample period. The root mean squared error of the position and set-point data would be below the predetermined threshold in this case, indicating that the cycling is due to aggressive tuning and not stick-slip.

Figure 6:
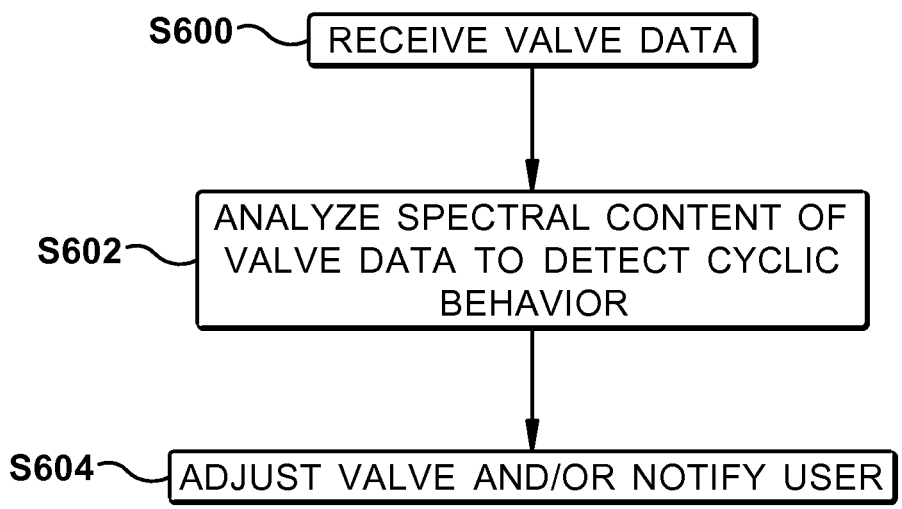
FIG. 6 is a flowchart that schematically illustrates an exemplary method of diagnosing a control valve.
Figure 7:
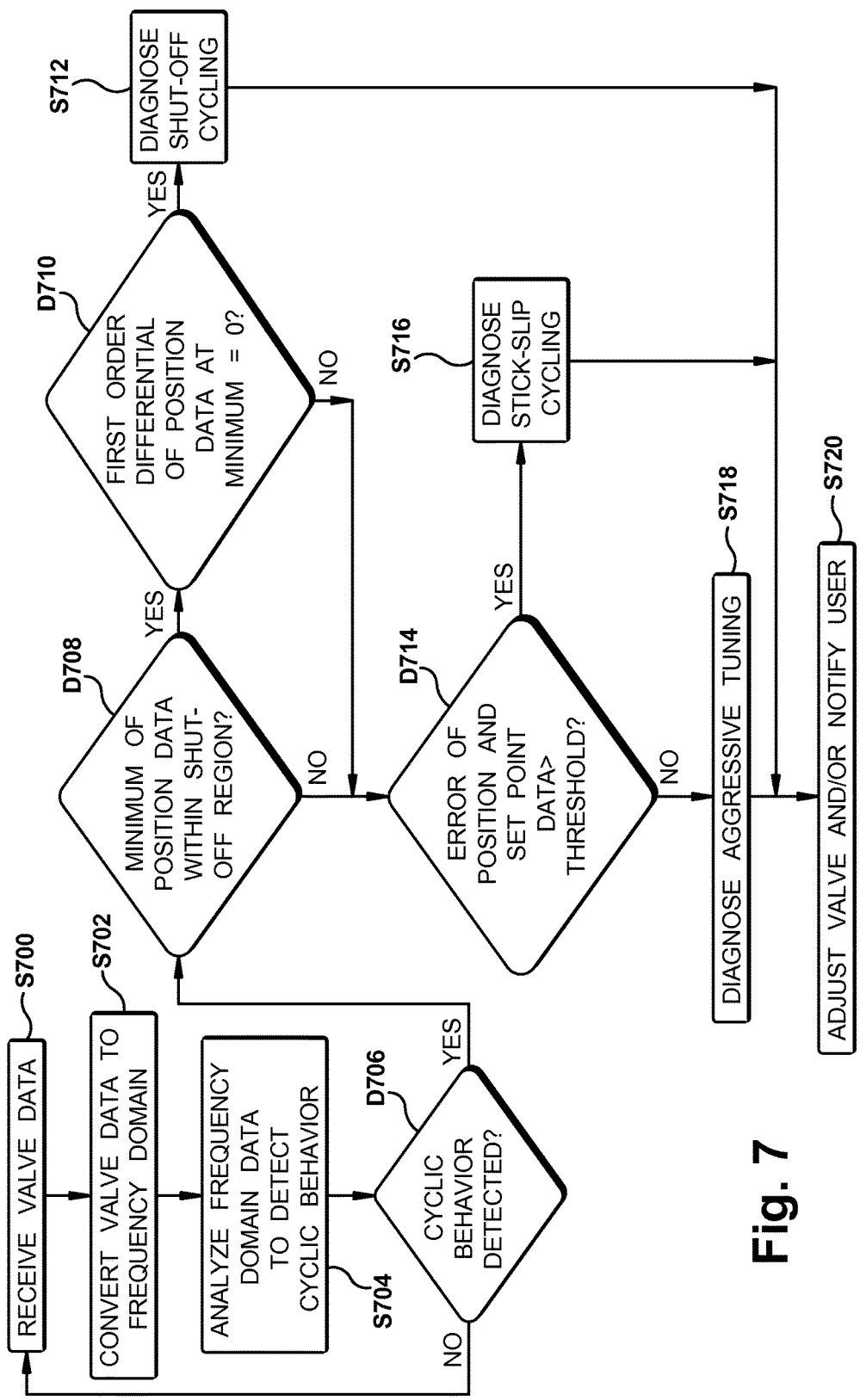
FIG. 7 is a flowchart that schematically illustrates another exemplary method of diagnosing a control valve.

Exemplary methods of diagnosing cyclic behavior in a control valve are illustrated schematically in FIGS. 6-7. In some embodiments, the methods can be executed by a computer system. While various methods disclosed herein may be shown in relation to flowcharts or sequence diagrams, it should be noted that any ordering of method steps implied by such flowcharts, sequence diagrams, or the description thereof is not to be construed as limiting the method to performing the steps in that order. Rather, the various steps of each of the methods disclosed herein can be performed in any of a variety of sequences. In addition, as the illustrated flowcharts and sequence diagrams are merely exemplary embodiments, various other methods that include additional steps or include fewer steps than illustrated are also within the scope of the present disclosure.

As shown in FIG. 6, an exemplary method can begin with a step S600 in which the computer system receives valve data corresponding to a control valve. The valve data can include one or more of position data, actuation force data, and set point data. The valve data can be received from sensors or controllers in a control system of which the valve is a component. In step S602, the computer system can analyze the spectral content of the valve data to detect cyclic behavior. In step S604, if cyclic behavior is detected, the computer system can adjust the valve or the control of the valve in an attempt to stop the cyclic behavior. Alternatively, or in addition, the computer system can generate an alert to inform a user of the presence and, optionally, the type of cyclic behavior.

As shown in FIG. 7, another exemplary method can begin with a step S700 in which the computer system receives valve data corresponding to a control valve. In step S702, the computer system can convert the valve data to a frequency domain. The frequency domain data can be analyzed by the computer system in step S704 to detect cyclic behavior. For example, if a dominant frequency exists in the frequency domain data, the computer system can determine that cyclic behavior is present. The computer system can also be configured to cross-validate a diagnosis of cyclic behavior. For example, the computer system can compare the dominant frequency of the position data to the dominant frequency of the actuation force data and check for a match, in which case a cross-validated diagnosis can be made. If cyclic behavior is not detected (no in decision block D706), execution returns to step S700 and the process repeats. If cyclic behavior is detected (yes in decision block D706), the computer system can diagnose the type of cyclic behavior that is present. In decision blocks D708 and D710, the computer system can determine whether the minimum of the position data is within a shut-off region of the valve and whether the first order differential of the position data at the minimum is approximately zero. If both conditions are met, shut-off cycling can be diagnosed in step S712. Otherwise, if either condition is not met, execution proceeds to decision block D714 where the computer system can determine whether the error (e.g., the root mean squared error) of the position data and the set point data is greater than a predetermined threshold. If the error exceeds the threshold (yes in decision block D714), stick-slip cycling can be diagnosed in step S716. Otherwise, aggressive tuning can be diagnosed in step S718. Once the type of cyclic behavior is diagnosed in one of steps S712, S716, or S718, the computer system can adjust the valve or the control of the valve in step S720 in an attempt to stop the cyclic behavior. Alternatively, or in addition, the computer system can generate an alert in step S720 to inform a user of the presence and, optionally, the type of cyclic behavior.

Figure 8:
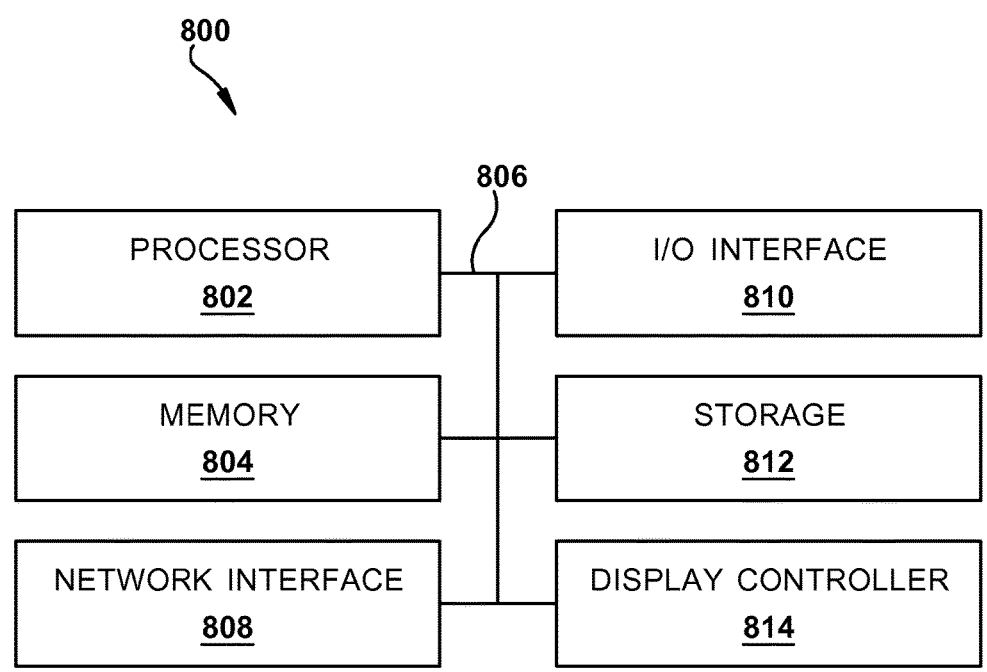
FIG. 8 is a schematic diagram of an exemplary computer system which can be used to implement at least a portion of the systems and methods disclosed herein.

FIG. 8 illustrates an exemplary architecture of a computer system or computer processor 800 which can be used to implement at least a portion of the systems and methods described above. Although an exemplary computer system 800 is depicted and described herein, it will be appreciated that this is for sake of generality and convenience. In other embodiments, the computer system may differ in architecture and operation from that shown and described here. For example, the computer processor can be or can include an embedded controller, an ASIC, an FPGA, and so forth.

The computer system 800 can include a processor 802 which controls the operation of the computer system 800, for example by executing an operating system (OS), device drivers, application programs, and so forth. The processor 802 can include any type of microprocessor or central processing unit (CPU), including programmable general-purpose or special-purpose microprocessors and/or any of a variety of proprietary or commercially-available single or multi-processor systems.

The computer system 800 can also include a memory 804, which provides temporary or permanent storage for code to be executed by the processor 802 or for data that is processed by the processor 802. The memory 804 can include read-only memory (ROM), flash memory, one or more varieties of random access memory (RAM), and/or a combination of memory technologies.

The various elements of the computer system 800 can be coupled to one another. For example, the processor 802 can be coupled to the memory 804. The various elements of the computer system 800 can be directly coupled to one another or can be coupled to one another via one or more intermediate components. The various elements of the computer system 800 can also be wirelessly coupled to one another. In the illustrated embodiment, the various elements of the computer system 800 are coupled to a bus system 806. The illustrated bus system 806 is an abstraction that represents any one or more separate physical busses, communication lines/interfaces, and/or multi-drop or point-to-point connections, connected by appropriate bridges, adapters, and/or controllers.

The computer system 800 can also include a network interface 808 which enables the computer system 800 to communicate with remote devices (e.g., other computer systems, the network 112, the DCS 110, the positioner 106, the asset management system 132, etc.) over a network.

The computer system 800 can also include an input/output (I/O) interface 810 which facilitates communication between one or more input devices, one or more output devices, and the various other components of the computer system 800. Exemplary input devices can include the actuator pressure sensor 114 and the valve position sensor 116.

The computer system 800 can also include a storage device 812, which can include any conventional medium for storing data in a non-volatile and/or non-transient manner. The storage device 812 can thus hold data and/or instructions in a persistent state (i.e., the value is retained despite interruption of power to the computer system 800). The storage device 812 can include one or more hard disk drives, flash drives, USB drives, optical drives, various media disks or cards, and/or any combination thereof and can be directly connected to the other components of the computer system 800 or remotely connected thereto, such as over a network.

The computer system 800 can also include a display controller 814 which can include a video processor and a video memory, and can generate images to be displayed on one or more electronic displays in accordance with instructions received from the processor 802.

The various functions performed by the computer system can be logically described as being performed by one or more modules. It will be appreciated that such modules can be implemented in hardware, software, or a combination thereof. It will further be appreciated that, when implemented in software, modules can be part of a single program or one or more separate programs, and can be implemented in a variety of contexts (e.g., as part of an operating system, a device driver, a standalone application, and/or combinations thereof). In addition, software embodying one or more modules can be stored as an executable program on one or more non-transitory computer-readable storage mediums. Functions disclosed herein as being performed by a particular module can also be performed by any other module or combination of modules, and the computer system can include fewer or more modules than what is shown and described herein.

The systems and methods disclosed herein can produce a number of advantages and/or technical effects. For example, in some embodiments, valve problems can be accurately diagnosed and reported, prompting an adjustment to the control logic for the valve or a repair or replacement of the valve. As a result, process efficiency can be improved and/or valve life can be extended.

Although the systems and methods disclosed herein are generally described in the context of a control valve, it will be appreciated that they have application in various other contexts. For example, the systems and methods disclosed herein can be used to diagnose cycling problems in any system in which the positioning of an object is being controlled. In some embodiments, the systems and methods disclosed herein can be used to diagnose stick slip on a drilling rig.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for diagnosing a control system using a computer processor in communications coupling with the control system, comprising:
    using the processor, receiving valve data corresponding to a valve, said valve data comprising at least one of position data generated by a position sensor configured to detect a position of the valve, actuation force data generated by an actuation force sensor configured to detect an actuation force applied to the valve, and set point data generated by the control system to control the position of the valve;
    using the processor, calculating a frequency spectrum of the valve data and analyzing said frequency spectrum to detect whether or not the valve is cycling; and
    if the valve is detected to be cycling, using the processor to at least one of adjust the control of the valve to stop the cycling and cause an electronic display to display a notification of the cycling; wherein the cycling comprises at least one of stick-slip cycling, shut-off cycling, and aggressive tuning.

2. The method of claim 1, wherein said analyzing comprises detecting that the valve is cycling if a dominant frequency exists in the frequency spectrum of the valve data.

3. The method of claim 1, wherein the valve data comprises position data and actuation force data and wherein said analyzing comprises detecting that the valve is cycling if a dominant frequency of the position data is approximately equal to a dominant frequency of the actuation force data.

4. The method of claim 1, wherein the valve data comprises position data and wherein said analyzing comprises detecting that the valve is experiencing shut-off cycling if cycling is detected, a minimum of the position data is within a shut-off region of the valve, and a first order differential of the position data at the minimum of the position data is approximately zero.

5. The method of claim 4, wherein the valve data comprises set point data and wherein said analyzing comprises detecting that the valve is experiencing stick-slip cycling if cycling is detected, the root mean squared error of the position data and the set point data is greater than a predetermined threshold, and shut-off cycling is not detected.

6. The method of claim 5, wherein said analyzing comprises detecting that the valve is experiencing aggressive tuning if cycling is detected, shut-off cycling is not detected, and stick-slip cycling is not detected.

7. A method, said method being executed by a computer processor, said method comprising:
receiving position data corresponding to a valve, said position data being generated by a valve position sensor configured to sense a position of the valve;
converting the position data to a frequency domain;
determining if a dominant frequency exists in the frequency domain of the position data; and
if it is determined that the dominant frequency exists in the frequency domain of the position data, diagnosing shut-off cycling if a minimum of the position data is within a shut-off region of the valve and a first order differential of the position data at the minimum of the position data is approximately zero;
if shut-off cycling is not diagnosed, receiving set point data corresponding to the valve and diagnosing stick-slip cycling if a root mean squared error of the position data and the set point data is greater than a predetermined threshold;
if shut-off cycling and stick-slip cycling are not diagnosed, diagnosing aggressive tuning; and
at least one of adjusting the control of the valve and causing an electronic display to display a notification of the presence and type of cycling of the valve; wherein the cycling comprises at least one of stick-slip cycling, shut-off cycling, and aggressive tuning.

8. The method of claim 7, further comprising:
receiving actuation force data corresponding to the valve;
converting the actuation force data to a frequency domain;
determining if a dominant frequency exists in the frequency domain of the actuation force data; and
diagnosing cyclic behavior only if it is determined that the frequency exists in the frequency domain of the position data, if it is determined that the dominant frequency exists in the frequency domain of the actuation force data, and if the position data dominant frequency is approximately equal to the actuation force data dominant frequency.

9. A system for diagnosing cyclic behavior of a valve, comprising:
a computer processor configured to
receive valve data comprising at least one of position data, actuation force data, and set point data corresponding to a valve;
detect whether or not the valve is cycling by analyzing a frequency spectrum of the valve data; and
at least one of adjust the control of the valve to stop the detected cycling and notify a user of the presence and type of the detected cycling; wherein the cycling comprises at least one of stick-slip cycling, shut-off cycling, and aggressive tuning.

10. The system of claim 9, wherein the computer processor is configured to notify the user by displaying, on an electronic display, a notification indicating the presence and type of the cycling.

11. The system of claim 9, wherein the computer processor is configured to instruct an actuator coupled to the valve to control a position of the valve so as to stop the cycling.

12. The system of claim 9, further comprising:
the valve;
an actuator coupled to the valve and configured to adjust a position of the valve based on said set point data;
a valve position sensor configured to sense a position of the valve and to generate said position data based on said sensing; and
an actuation force sensor configured to sense an actuation force exerted on the valve by the actuator and to generate said actuation force data based on said sensing.

13. The system of claim 9, further comprising a valve position sensor configured to generate said position data and an actuation force sensor configured to generate said actuation force data.

14. The system of claim 9, wherein the processor is configured to detect that the valve is cycling if a dominant frequency exists in the frequency spectrum of the valve data.

15. The system of claim 9, wherein the valve data comprises position data and actuation force data and wherein the processor is configured to detect that the valve is cycling if a dominant frequency of the position data is approximately equal to a dominant frequency of the actuation force data.

16. The system of claim 9, wherein the valve data comprises position data and wherein the processor is configured to detect that the valve is experiencing shut-off cycling if cycling is detected, the minimum of the position data is within a shut-off region of the valve, and the first order differential of the position data at the minimum is approximately zero.

17. The system of claim 16, wherein the valve data comprises set point data and wherein the processor is configured to detect that the valve is experiencing stick-slip cycling if cycling is detected, the root mean squared error of the position data and the set point data is greater than a predetermined threshold, and shut-off cycling is not detected.

18. The system of claim 17, wherein the processor is configured to detect that the valve is experiencing aggressive tuning if cycling is detected, shut-off cycling is not detected, and stick-slip cycling is not detected.

19. The method of claim 1, further comprising, using the processor, instructing the valve to move to a specified position; and
wherein the cycling comprises the valve experiencing cyclic motion as the valve attempts to move to the specified position in response to the instructing.

20. The method of claim 1, wherein calculating the frequency spectrum includes converting the valve data to the frequency spectrum using a Fourier transform.

* * * * *